US012063322B2

(12) United States Patent
Haraguchi

(10) Patent No.: US 12,063,322 B2
(45) Date of Patent: Aug. 13, 2024

(54) USE RESTRICTION METHOD, PORTABLE TERMINAL, AND STORAGE MEDIUM

(71) Applicant: COMBINE BRIDGE LLC, Tokyo (JP)

(72) Inventor: Yuta Haraguchi, Sapporo (JP)

(73) Assignee: COMBINE BRIDGE LLC, Tokyo (JP)

( * ) Notice: Subject to any disclaimer, the term of this patent is extended or adjusted under 35 U.S.C. 154(b) by 233 days.

(21) Appl. No.: 17/766,861

(22) PCT Filed: Mar. 26, 2020

(86) PCT No.: PCT/JP2020/013596
§ 371 (c)(1),
(2) Date: Apr. 6, 2022

(87) PCT Pub. No.: WO2021/100220
PCT Pub. Date: May 27, 2021

(65) Prior Publication Data
US 2023/0275988 A1   Aug. 31, 2023

(30) Foreign Application Priority Data
Nov. 18, 2019   (JP) .................................. 2019-207693

(51) Int. Cl.
*H04M 1/72463*   (2021.01)
*H04M 1/72454*   (2021.01)

(52) U.S. Cl.
CPC .............. *H04M 1/724631* (2022.02); *H04M 1/72454* (2021.01); *H04M 1/72463* (2021.01)

(58) Field of Classification Search
CPC ....... H04M 1/724631; H04M 1/72454; H04M 1/72463

USPC .............. 455/414.1, 418–420, 456.1–456.6, 455/565–569.2
See application file for complete search history.

(56) References Cited

U.S. PATENT DOCUMENTS

| 2011/0208545 A1* | 8/2011 | Kuester ............. H04M 1/72454 455/418 |
| 2012/0185931 A1* | 7/2012 | Shimotono ............ G06F 21/31 726/16 |
| 2018/0204437 A1* | 7/2018 | Singh .................... G08B 21/02 |

FOREIGN PATENT DOCUMENTS

| JP | 2003216578 A | 7/2003 |
| JP | 2008163579 A | 7/2008 |
| JP | 2013172359 A | 9/2013 |
| JP | 2014215265 A | 11/2014 |
| JP | 2014220636 A | 11/2014 |

(Continued)

*Primary Examiner* — Michael Y Mapa
(74) *Attorney, Agent, or Firm* — Muncy, Geissler, Olds & Lowe, P.C.

(57) ABSTRACT

A system that is capable of preventing an operation-while-moving and giving an advantage to a user, a communication carrier, or the like is proposed. A use restriction method for a portable terminal includes: a detection step of detecting an operation-while-moving performed by a user on the portable terminal; a restriction step of restricting the user's use of the portable terminal; a reproduction step of reproducing question type content while the user's use is being restricted and a stop of movement of the user is being detected; and a releasing step of terminating the reproducing of the question type content and releasing the restricting, in a case where the user has completed answering the question type content.

7 Claims, 6 Drawing Sheets

(56) References Cited

FOREIGN PATENT DOCUMENTS

| JP | 2015099493 A | 5/2015 |
| JP | 2015216464 A | 12/2015 |
| JP | 2016157178 A | 9/2016 |
| JP | 2019-129459 A | 8/2019 |
| KR | 101534093 B1 | 7/2015 |

\* cited by examiner

| COUNT VALUE OF NUMBER OF USE RESTRICTIONS (TIME) | 0 | 1 | 2 | 3 | 4 | n |
|---|---|---|---|---|---|---|
| FIRST THRESHOLD (SECOND) | 10 | 9 | 8 | 7 | 6 | 10−n |
| SECOND THRESHOLD (SECOND) | 5 | 10 | 15 | 20 | 25 | 5n+5 |
| NUMBER OF QUESTIONS | 1 | 2 | 3 | 4 | 5 | n+1 |
| RESET PERIOD (DAY) | 1 | 1 | 1 | ∞ | ∞ | ∞ |

121

| COUNT VALUE OF NUMBER OF USE RESTRICTIONS | 0 | − |
|---|---|---|
| RESET DATE AND TIME | 9/31 00:00:00 | − |
| USE RESTRICTION DATE AND TIME | QUESTION ID | ANSWER |
| ⋮ | ⋮ | ⋮ |
| 10/1/07:31:20 | A10 | YES |
| 10/1/08:40:12 | B55<br>A08 | NO<br>YES |
| 10/1/18:15:45 | A21<br>D18<br>B05 | NO<br>YES<br>YES |
| ⋮ | ⋮ | ⋮ |

122

USE RESTRICTION METHOD, PORTABLE TERMINAL, AND STORAGE MEDIUM

TECHNICAL FIELD

The present invention relates to a use restriction method, a portable terminal, and a storage medium. The present invention claims the benefit of priority of Japanese Patent Application No. 2019-207693, filed on Nov. 18, 2019, the contents of which are incorporated herein by reference in designated countries that allow documents to be incorporated by reference.

BACKGROUND ART

An action of operating a smartphone while walking, what is called "the use of a smartphone while walking", has a risk of causing trouble not only for a user themselves but also for persons around the user, and this has raised an issue.

As a countermeasure against the above, for example, Patent Literature 1 describes a technology in which in a case where a user of a terminal device such as a smartphone is walking, and is in a state of gazing at a display unit, the operability of the terminal device is reduced, and in order to release a reduction in operability, it is requested that the user perform a task such as a motion to raise the terminal device.

CITATION LIST

Patent Literature

Patent Literature 1: JP 2019-129459 A

SUMMARY OF INVENTION

Technical Problem

In addition to the technology described in Patent Literature 1, there are many technologies for preventing the use of a smartphone while walking. However, in practice, the cases of existing technologies give a user a small advantage excluding autonomously restricting the use of a smartphone while walking. Therefore, it is difficult to say that the existing technologies have widely spread.

The present invention has been made in view of such a situation, and it is an object of the present invention to propose a system that is capable of preventing an operation-while-moving from being performed on a portable terminal such as a smartphone, and giving an advantage to a user, a communication carrier, or the like.

Solution to Problem

The present application includes a plurality of solutions to at least some of the problems described above, and examples of the plurality of solutions are described below.

In order to solve the problems described above, a use restriction method in one aspect of the present invention includes: a detection step of detecting an operation-while-moving performed by a user on the portable terminal; a restriction step of restricting the user's use of the portable terminal; a reproduction step of reproducing question type content while the user's use is being restricted and a stop of movement of the user is being detected; and a releasing step of terminating the reproducing of the question type content and releasing the restricting, in a case where the user has completed answering the question type content.

In the restriction step, the user's use of the portable terminal can be restricted, in a case where a time period of the operation-while-moving of the user exceeds a first threshold.

In the releasing step, the reproducing of the question type content can be terminated, and the restricting can be released, in a case where the user has completed answering the question type content, and a time period of the stop of movement of the user exceeds a second threshold.

The use restriction method can include a condition setting step of setting at least one of the first threshold, the second threshold, and a number of questions in the question type content in accordance with history of the restricting.

In the condition setting step, as a number of times of the restricting in past increases, the first threshold can be set to have a smaller value, the second threshold can be set to have a larger value, and the number of questions in the question type content can be set to have a larger value.

The use restriction method can include a resetting step of resetting the history of the restricting.

In the restriction step, visual recognition and an operation of the user can be restricted by erasing a current display screen of the portable terminal, or by superimposing another display onto the current display screen.

The use restriction method can include an alerting step of alerting the user in a case where the operation-while-moving of the user has been sensed prior to the restriction step.

A portable terminal in another aspect of the present invention includes: an operation-while-moving detection unit that detects an operation-while-moving performed by a user on the portable terminal; a restriction unit that restricts the user's use of the portable terminal; and a content reproduction unit that reproduces question type content while the user's use is being restricted and a stop of movement of the user is being detected, in which in a case where the user has completed answering the question type content, the content reproduction unit terminates reproduction of the question type content, and the restriction unit releases use restriction imposed on the user.

A storage medium in yet another aspect of the present invention stores a program causing a computer of a portable terminal to execute a process including: a detection step of detecting an operation-while-moving performed by a user on the portable terminal; a restriction step of restricting a user's use of the portable terminal; a reproduction step of reproducing question type content while the user's use is being restricted and a stop of movement of the user is being detected; and a releasing step of terminating the reproducing of the question type content and releasing the restricting, in a case where the user has completed answering the question type content.

Advantageous Effects of Invention

According to the present invention, a system that is capable of preventing an operation-while-moving from being performed on a portable terminal, and giving an advantage to a user, a communication carrier, or the like can be proposed.

Problems, configurations, and effects that are different from the above will become apparent from the description below of an embodiment.

DESCRIPTION OF EMBODIMENTS

An embodiment according to the present invention is described below with reference to the drawings. Note that, in all of the drawings for explaining the embodiment, as a general rule, the same member is denoted by the same reference sign, and the repetitive description thereof is omitted. Furthermore, needless to say, in the embodiment described below, its components (also including element steps or the like) are not necessarily essential, unless otherwise specified, or excluding a case where the components are obviously considered to be essential in principle, and other cases. Moreover, when "be made up of A", "be constituted by A", "have A", or "include A" is used, it is needless to say that other elements are not excluded, excluding a case where only A is particularly specified as an element, and other cases. Similarly, in the embodiment described below, when a shape, a positional relationship, or the like of a component or the like is referred to, for example, shapes, positional relationships, or the like that approximate to or are similar to the shape, the positional relationship, or the like that has been referred to are substantially included, unless otherwise specified, or excluding a case where it is obviously considered that this is not the case in principle, and other cases.

<Example of Configuration of Communication System Including Portable Terminal According to an Embodiment of the Present Invention>

Figure 1:
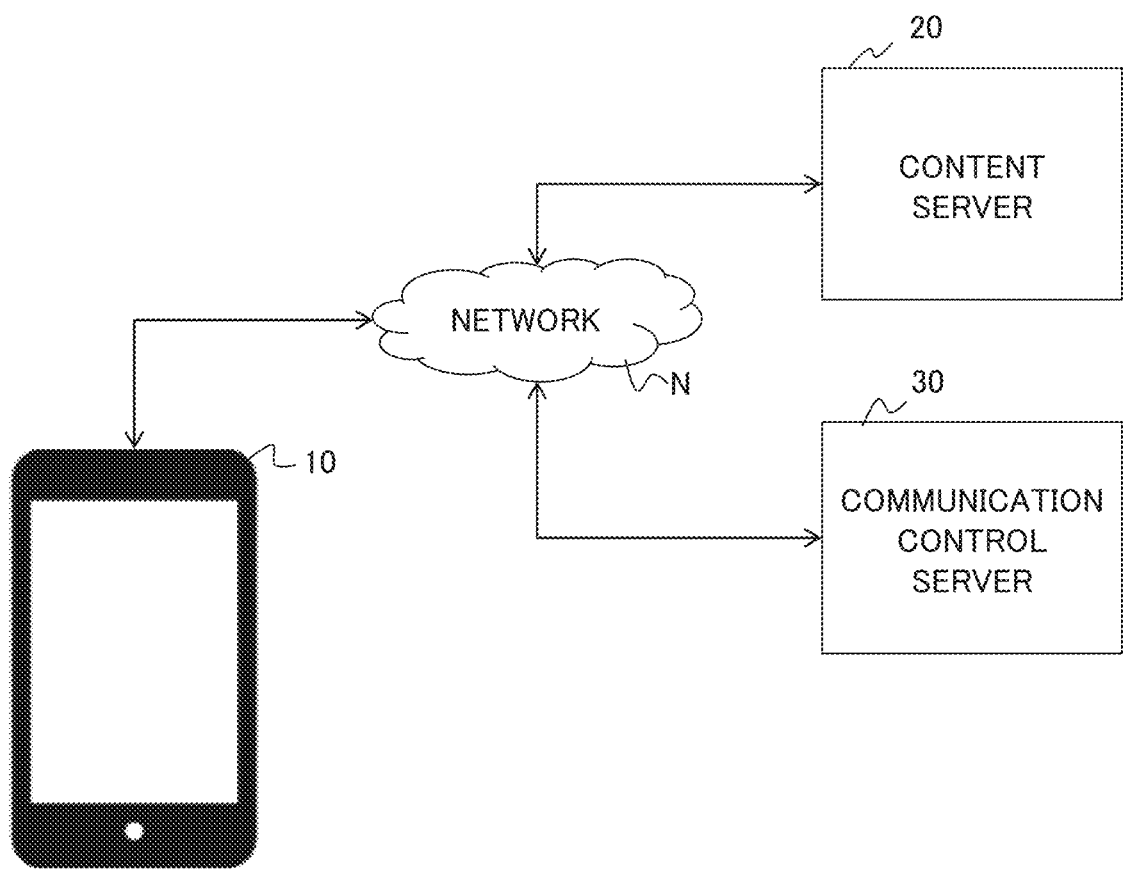
FIG. 1 is a diagram illustrating an example of a configuration of a communication system including a portable terminal according to an embodiment of the present invention.

FIG. 1 illustrates an example of a configuration of a communication system including a portable terminal according to an embodiment of the present invention.

The communication system includes a portable terminal 10, a content server 20, and a communication control server 30.

An application program for preventing a user from performing an operation while moving, what is called the "use of a smartphone while walking", (hereinafter referred to as an "application for preventing the use of a smartphone while walking") has been installed in advance in the portable terminal 10. The application for preventing the use of a smartphone while walking is started at the same time that the portable terminal 10 is activated, and the application is continuously executed while a power supply of the portable terminal 10 is in an ON state. The application for preventing the use of a smartphone while walking corresponds to a program according to the present invention.

However, an operation-while-moving according to the present embodiment does not only include viewing a screen or performing an operation while walking, but also includes viewing a screen or performing an operation while driving an automobile or a motorcycle or riding a bicycle or the like.

In addition to smartphones, conceivable examples of the portable terminal 10 include electronic devices that a user can carry, such as portable telephones, tablet type computers, or portable game machines.

The portable terminal 10 is connected to the content server 20 and the communication control server 30 via a network N. The network N is a wireless intercommunication network such as a portable telephone communication network, a wireless LAN, or the Internet.

The content server 20 is managed, for example, by a seller or the like of the application for preventing the use of a smartphone while walking. The content server 20 transmits question type content to be reproduced in the portable terminal 10, via the network N to the portable terminal 10.

The communication control server 30 is managed, for example, by a communication carrier. The communication control server 30 controls calls using the portable terminal 10 via the network N. In addition, the communication control server 30 controls data communication of the portable terminal 10 via the network N. Specifically, for example, a communication band is limited according to an amount of data communication, or the limited communication band is released.

Figure 2:
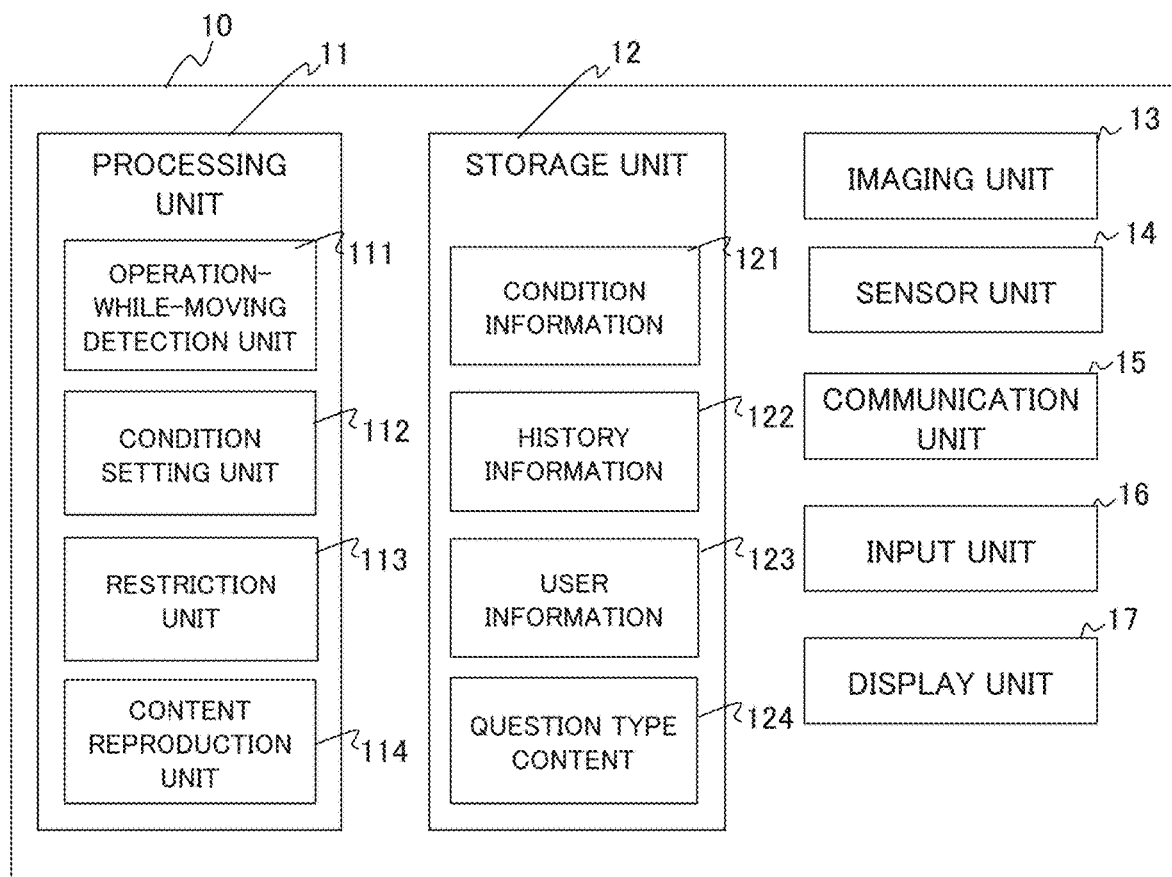
FIG. 2 is a diagram illustrating an example of a configuration of functional blocks of the portable terminal.

Next, FIG. 2 illustrates an example of a configuration of functional blocks of the portable terminal 10.

The portable terminal 10 includes a processing unit 11, a storage unit 12, an imaging unit 13, a sensor unit 14, a communication unit 15, an input unit 16, and a display unit 17.

The processing unit 11 is made up of, for example, a central processing unit (CPU) included in a smartphone or the like, and comprehensively controls the entirety of the portable terminal 10. In addition, the processing unit 11 executes the application for preventing the use of a smartphone while walking that has been installed in advance in the portable terminal 10 in such a way that an operation-while-moving detection unit 111, a condition setting unit 112, a restriction unit 113, and a content reproduction unit 114 are implemented.

The operation-while-moving detection unit 111 detects an operation-while-moving and the stop of movement of a user on the basis of an output of each of the imaging unit 13, the sensor unit 14, and the input unit 16, and measures a time period of the operation-while-moving and a time period of the stop of movement. Note that an existing technology can be appropriately employed as a method performed by the operation-while-moving detection unit 111 for detecting an operation-while-moving and the stop of movement of a user.

The condition setting unit 112 sets a first threshold, a second threshold, and the number of questions that will be described below, on the basis of condition information 121 and history information 122 that have been recorded in the storage unit 12.

In a case where the operation-while-moving detection unit 111 has detected a user's operation-while-moving, the restriction unit 113 alerts the user in such a way that the user will stop the operation-while-moving. Specifically, for example, the message for alerting "Use of smartphone while walking is dangerous!" or the like is displayed in such a way that the message is superimposed onto a current display screen (for example, a screen of an email, a message, a game, a social network system (SNS), or the like).

In addition, in a case where a time period during which the operation-while-moving is continuing exceeds the first threshold, the restriction unit 113 restricts the user's use of the portable terminal 10. Specifically, for example, a current display screen is erased or another image is superimposed and displayed in such a way that the user fails to visually recognize and operate the current display screen. However, it is desirable that a telephone function be not restricted even while the user's use is being restricted, in consideration of the occurrence of an emergency.

Further, the restriction unit 113 generates and updates the history information 122 indicating the history of restricting the user's use of the portable terminal 10. The history information 122 is recorded in the storage unit 12. Furthermore, the restriction unit 113 releases the restriction of the user's use.

In a case where the user's use has been restricted, and the operation-while-moving detection unit 111 has detected the stop of movement of the user, the content reproduction unit 114 reproduces the question type content 124 that has been transmitted in advance from the content server 20 and has been recorded in the storage unit 12, and superimposes and displays the question type content 124 on a display screen.

In the reproduced question type content 124, questions that the user will be requested to answer are displayed a number of questions that has been set according to the number of restrictions in the past. Note that a question to be asked a user may be determined at random, or may be determined according to use environment such as date and time, the season, or an area. In addition, the question may be determined on the basis of a user attribute recorded in the user information 123 of the storage unit 12, or may be determined on the basis of a user's answer in the past.

Further, in a case where a user has completed answering all of the questions of the question type content 124 and a time period of the stop of movement exceeds the second threshold, the content reproduction unit 114 terminates the question type content.

The storage unit 12 is made up of, for example, a semiconductor memory or the like that is included in a smartphone or the like, and is used as a work area of the processing unit 11 or a storage area of various types of information. The storage unit 12 stores the condition information 121, the history information 122, the user information 123, and the question type content 124.

Figure 3:
FIG. 3 is a diagram illustrating an example of condition information.

FIG. 3 illustrates an example of the condition information 121. In the condition information 121, a first threshold, a second threshold, the number of questions, and a reset period have been recorded in association with a count value of the number of use restrictions obtained by counting the number of use restrictions in the past according to a predetermined rule.

The first threshold is a value for a comparison with a time period of an operation-while-moving of a user. The second threshold is a value for a comparison with a time period of the stop of movement of a user. The number of questions is the number of questions to be asked a user in the reproduced question type content 124. The reset period is a value indicating a period of resetting a count value of the number of use restrictions that has been recorded in the history information 122 to 0.

The first threshold having a smaller value is recorded as the count value of the number of use restrictions increases. The second threshold having a larger value is recorded as the count value of the number of use restrictions increases. The number of questions having a larger value is recorded as the count value of the use restrictions increases. A reset period of 1 day is recorded when the count value of the number of use restrictions is 0 to 2, and a reset period of ∞ (this means that resetting is not performed) is recorded when the count value of the number of use restrictions is 3 or more.

In the example of the same drawing, for example, in a case where the count value of the number of use restrictions is 0, the first threshold is 10 seconds, the second threshold is 5 seconds, the number of questions is 1, and the reset period is 1 day. As another example, in a case where the count value of the number of use restrictions is 1, the first threshold is 9 seconds, the second threshold is 10 seconds, the number of questions is 2, and the reset period is 1 day.

Figure 4:
FIG. 4 is a diagram illustrating an example of history information.

FIG. 4 illustrates an example of the history information 122. The history information 122 is generated and updated by the restriction unit 113. In the history information 122, a count value of the number of use restrictions, reset date and time, and date and time of use restriction in the past, a question ID indicating a question in the question type content 124 reproduced in the use restriction, and a user's answer to the question have been recorded. The count value of the number of use restrictions is a value obtained by counting the number of pieces of data recorded in the history information 122, that is, the number of use restrictions in the past, according to a predetermined rule. The reset date and time is date and time of previously resetting the count value of the number of use restrictions.

Return to FIG. 2. In the user information 123, a user's attribute information (age, gender, a residential area, a language to be used, a type of occupation, or the like) has been recorded. The user information 123 is referred to when a question in the reproduced question type content 124 is determined. The question type content 124 has been transmitted in advance by the content server 20, and has been received by the communication unit 15.

The imaging unit 13 is made up of, for example, a camera unit included in a smartphone or the like, and the imaging unit 13 images a user's face at the time of detecting an operation-while-moving of the user, and outputs a captured image to the operation-while-moving detection unit 111. An image of a user's face is used to detect the user's line of sight serving as one of determination criteria for detecting an operation-while-moving.

The sensor unit 14 is made up of, for example, various sensor units, such as a proximity sensor, an acceleration sensor, a gyro sensor, or a global positioning system (GPS) sensor, that are included in a smartphone or the like, and the sensor unit 14 outputs a result of sensing of each of the sensor units to the operation-while-moving detection unit 111 at the time of detecting an operation-while-moving of a user.

The communication unit 15 is made up of, for example, a communication module included in a smartphone or the like, and the communication unit 15 performs communication with the content server 20 or the like via the network N. The input unit 16 is made up of, for example, a touch panel or the like that has been stacked on a display in a smartphone or the like, and the input unit 16 receives a user's operation, and outputs the operation to the processing unit 11. The display unit 17 is made up of, for example, a display included in a smartphone or the like, and the display unit 17 displays various screens.

<Restriction History Resetting Processing Performed by Portable Terminal 10>

Next, restriction history resetting processing performed by the portable terminal 10 is described.

Figure 5:
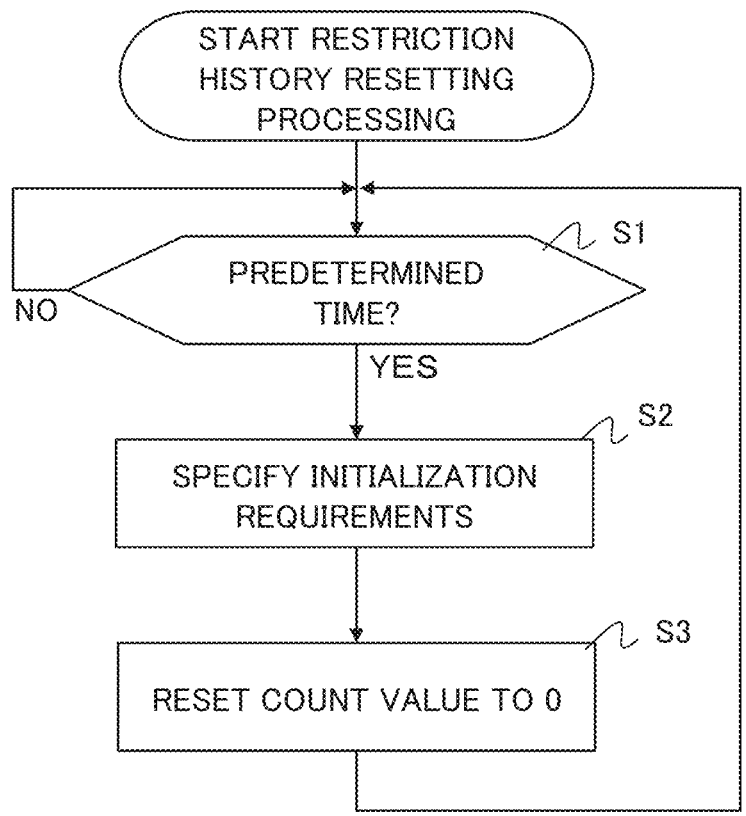
FIG. 5 is a flowchart explaining an example of restriction history resetting processing.

FIG. 5 is a flowchart explaining an example of restriction history resetting processing. Restriction history resetting processing is continuously performed while the power supply of the portable terminal 10 is in the ON state.

First, the restriction unit 113 obtains the current time, and determines whether the current time is a predetermined time (for example, 0:0:0 a.m.) (step S1). In a case where the restriction unit 113 determines that the current time is not the predetermined time (NO in step S1), the restriction unit 113 continues to obtain the current time until the current time becomes the predetermined time.

Thereafter, in a case where the restriction unit 113 determines that the current time is the predetermined time (YES in step S1), the restriction unit 113 refers to the condition information 121 and the history information 122 that have been recorded in the storage unit 12, and specifies a reset period (step S2).

Specifically, the restriction unit 113 reads a count value of the number of use restrictions that has been recorded in the history information 122, refers to the condition information 121, and specifies a reset period that corresponds to the count value of the number of use restrictions. For example, in a case where the count value of the number of use restrictions is 2, 1 day is specified as a reset period that corresponds to the number of use restrictions of 2, on the basis of the condition information 121.

Next, the restriction unit 113 resets the count value of the number of use restrictions that has been recorded in the history information 122 to 0, in accordance with the reset period specified in step S2 (step S3). Specifically, only in a case where a time period from reset date and time recorded in the history information 122 to the current date and time is greater than or equal to the reset period, the count value of the number of use restrictions is reset to 0. In contrast, in a case where a time period from reset date and time recorded in the history information 122 to the current date and time is less than the reset period, the count value of the number of use restrictions is not reset.

After step S3, the processing returns to step S1, and the process of step S1 and processes that follow are repeated.

By performing the restriction history resetting processing described above, the count value of the number of use restrictions of the history information 122 can be reset to 0. However, in a case where the count value of the number of use restrictions is 3 or more, the count value of the number of use restrictions is not reset. Therefore, more strict use restriction can be imposed on a user who habitually performs an operation while walking.

However, as a remedy for such a user, for example, in a case where a condition in which the average number of use restrictions per day in the past one month is less than or equal to a predetermined number or another condition is satisfied, the count value of the number of use restrictions may be reset to 0.

<Use Restriction Processing Performed by Portable Terminal 10>

Next, use restriction processing performed by the portable terminal 10 is described.

Figure 6:
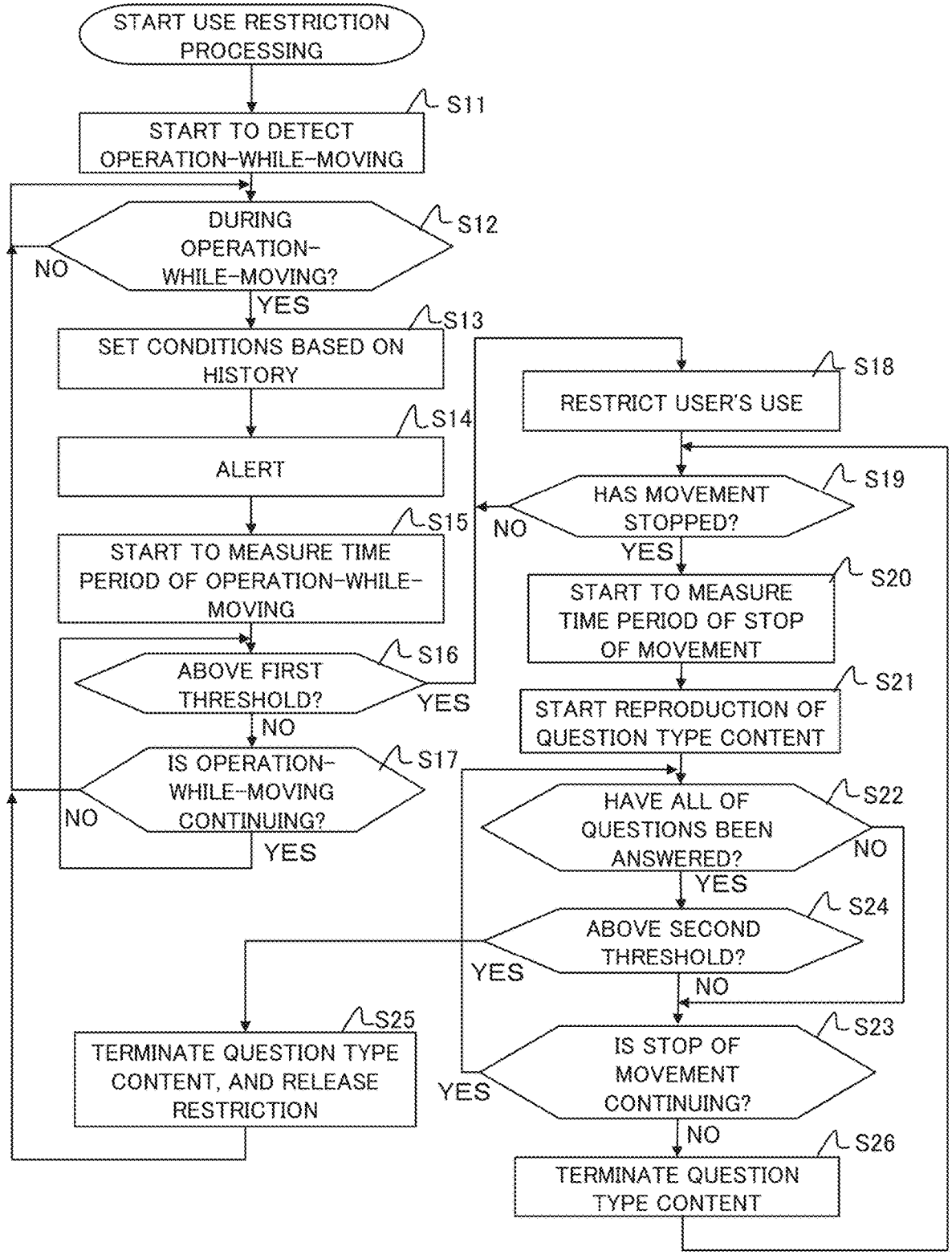
FIG. 6 is a flowchart explaining an example of use restriction processing.

FIG. 6 is a flowchart explaining an example of use restriction processing. FIGS. 7(A), 7(b), 7(C) and 7(D) illustrate examples of a display on a screen for explaining use restriction processing.

Use restriction processing is continuously performed while the power supply of the portable terminal 10 is in the ON state.

First, the operation-while-moving detection unit 111 starts to detect an operation-while-moving (including the stop of movement) of a user on the basis of an output of each of the imaging unit 13, the sensor unit 14, and the input unit 16 (step S11). Next, the operation-while-moving detection unit 111 determines whether the user is performing an operation while moving (step S12). Specifically, for example, in a case where the sensor unit 14 has detected a movement of the portable terminal 10, and at least one has been confirmed from among a situation where it has been detected on the basis of an image captured by the imaging unit 13 that a user is viewing a screen, and a situation where the input unit 16 has detected an input from the user, it is determined that the user is performing an operation while moving.

Here, in a case where the operation-while-moving detection unit 111 determines that the user is not performing an operation while moving (NO in step S12), the operation-while-moving detection unit 111 continues the detection of an operation-while-moving of the user.

In contrast, in a case where the operation-while-moving detection unit 111 determines that the user is performing an operation while moving (YES in step S12), the condition setting unit 112 then sets various conditions on the basis of the condition information 121 and the history information 122 that have been recorded in the storage unit 12 (step S13).

Specifically, a count value of the number of use restrictions is read from the history information 122, a first threshold, a second threshold, and the number of questions that correspond to the count value of the number of use restrictions are read from the condition information 121, the first threshold and the second threshold are set in the restriction unit 113, and the number of questions is set in the content reproduction unit 114.

Figure 7A:
FIGS. 7(A), 7(b), 7(C) and 7(D) illustrate examples of a display on a screen for explaining use restriction processing.
Figure 7B:
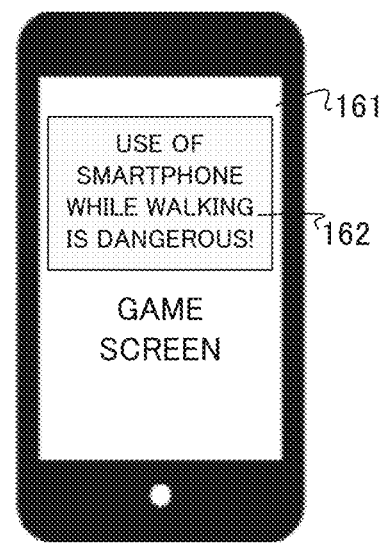

Next, the restriction unit 113 alerts the user who is performing an operation while moving (step S14). Specifically, for example, as illustrated in FIG. 7(B), an alerting message (in the example of FIG. 7(B), "Use of smartphone while walking is dangerous!") 162 is displayed in a transmission manner on a current display screen (in the example of FIG. 7(A), a game screen) 161, as illustrated in FIG. 7(A). Note that the user may be alerted by using sound or vibration instead of or in addition to the alerting message 162.

Next, the operation-while-moving detection unit 111 resets a time period of an operation-while-moving to 0, and starts to measure the time period of the operation-while-moving (step S15), and determines whether the time period of the operation-while-moving exceeds the first threshold (step S16). Here, in a case where the operation-while-moving detection unit 111 determines that the time period of the operation-while-moving does not exceed the first threshold (NO in step S16), the operation-while-moving detection unit 111 then determines whether the user's operation-while-moving is continuing (step S17).

Here, in a case where the operation-while-moving detection unit 111 determines that the user's operation-while-moving is continuing (YES in step S17), the processing returns to step S16, and steps S16 and S17 are repeated. In contrast, in a case where the operation-while-moving detection unit 111 determines that the user's operation-while-moving is not continuing (the user has stopped an operation-while-moving) (NO in step S17), the processing returns to step S12.

In a case where the user is continuing an operation-while-moving, and the operation-while-moving detection unit 111 determines that a time period of the operation-while-moving exceeds the first threshold (YES in step S16), the restriction unit 113 then restricts the user's use, and updates the history information 122 (step S18).

Figure 7C:
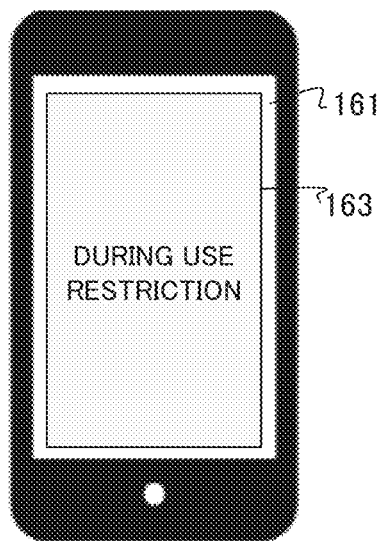

Specifically, the restriction unit 113 erases the alerting message 162, superimposes and displays, for example, a warning message (in the example of FIG. 7(C), "during use restriction") 163 indicating that use is being restricted, as illustrated in FIG. 7(C), in such a way that the warning message covers the entirety of the display screen 161, and invalidates the user's input of an operation. Note that it may be reported that use is being restricted, by using sound or vibration in addition to the warning message 163.

Further, the restriction unit 113 adds the current date and time of use restriction to the history information 122, and increments a count value of the number of use restrictions by 1. Therefore, the history information 122 is updated.

Next, the operation-while-moving detection unit 111 determines whether the user's movement has stopped (step S19). Here, in a case where the operation-while-moving detection unit 111 determines that the user's movement has not stopped (NO in step S19), the processing returns to step S18. Stated another way, use restriction imposed on the user is continued.

In contrast, in a case where it has been determined that the user's movement has stopped (YES in step S19), the operation-while-moving detection unit 111 then resets a time period of the stop of movement to 0, and starts to measure the time period of the stop of movement (step S20).

Figure 7D:
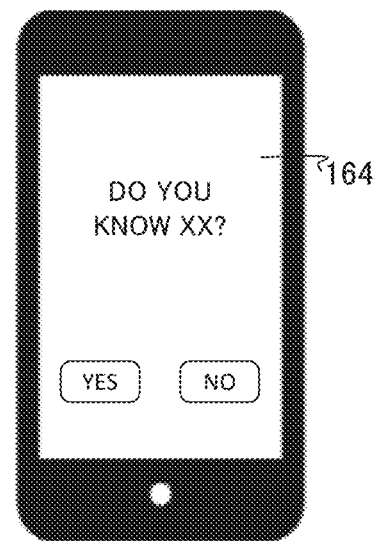

Next, the content reproduction unit 114 reads the question type content 124 recorded in the storage unit 12, and starts reproduction (step S21). In the reproduced question type content 124, questions 164 in the form of presenting the user with options, for example, as illustrated in FIG. 7(D), are sequentially displayed a number of questions that has been set in step S13. Note that an input of an operation to be performed by the user on the reproduced question type content 124 is validated, and the user can give an answer by selecting an option for each of the questions. Note that a question ID indicating a question in the reproduced question type content 124 and the user's answer to the question are output from the content reproduction unit 114 to the restriction unit 113, and the restriction unit 113 adds the question ID and the user's answer to the history information 122 in the storage unit 12.

Next, the content reproduction unit 114 determines whether the user has answered all of the sequentially displayed questions (step S22). Here, in a case where the content reproduction unit 114 determines that the user has not yet answered all of the questions, and stated another way, there remains a question that has not yet been answered (NO in step S22), the operation-while-moving detection unit 111 then determines whether the stop of movement of the user is continuing (step S23).

Here, in a case where the operation-while-moving detection unit 111 determines that the stop of movement of the user is not continuing, and stated another way, the user has started movement again (NO in step S23), the content reproduction unit 114 then terminates reproduction of the question type content 124 (step S26). Thereafter, the processing returns to step S18. Stated another way, the user's use is restricted again.

In contrast, in a case where the operation-while-moving detection unit 111 determines that the stop of movement of the user is continuing (YES in step S23), the processing returns to step S22, and step S22 and steps that follow are repeated. Thereafter, in a case where the content reproduction unit 114 determines that the user has answered all of the questions (YES in step S22), the operation-while-moving detection unit 111 then determines whether a time period of the stop of movement exceeds the second threshold (step S24). Here, in a case where the operation-while-moving detection unit 111 determines that the time period of the stop of movement does not exceed the second threshold (NO in step S24), the processing proceeds to step S23 again.

In contrast, in a case where the operation-while-moving detection unit 111 determines that the time period of the stop of movement exceeds the second threshold (YES in step S24), the content reproduction unit 114 then terminates reproduction of the question type content 124, and the restriction unit 113 releases use restriction imposed on the user (step S25). Thereafter, the processing returns to step S12, and step S12 and steps that follow are repeated.

By performing the use restriction processing described above, in a case where an operation-while-moving of a user has been sensed, the user can be alerted. In addition, in a case where the user has been alerted, but the user continues the operation-while-moving, and a time period of the operation-while-moving exceeds a first threshold, the user's use can be restricted. Then, in a case where the user has stopped movement, question type content is reproduced. In a case where the user has answered all of the questions and in a case where a time period of the stop of movement exceeds a second threshold, use restriction imposed on the user can be released. Note that in a case where there remains a question that has not yet been answered or in a case where the user's movement has started again, use restriction can be continued. This can prevent the user from performing an operation-while-moving.

<Variations>

In the use restriction processing described above, in a case where a user has answered all of the questions and a time period of the stop of movement exceeds a second threshold, use restriction imposed on the user is released. However, for example, in a case where the user has accepted a contribution to a disaster or the like or payment via the question type content, use restriction may be released.

As an example of use restriction imposed on the user, a communication band of data via the network N may be restricted. The restriction unit 113 may control the communication unit 15 to restrict the communication band, or the communication control server 30 may restrict the communication band in cooperation with the communication control server 30.

<Question Type Content>

Question type content to be reproduced during use restriction can be utilized, for example, as public service announcements or enterprise advertisements. Specifically, for example, a communication carrier or the like that sells smartphones in which an application for preventing the use of a smartphone while walking has been preinstalled may collect advertisers (administration, enterprises, or the like), and may return, to a user, part of the collected advertisement rates as a discount on a communications cost or the like, points, or the like. By doing this, all of the user, the communication carrier or the like, and the advertisers can gain an advantage.

Conceivable examples of public service announcements are described below.

Announcement warning the use of smartphone while walking

For example, "This year, 1,000 accidents occurred at the time of the use of smartphone while walking. Are you the next perpetrator?"

For example, "In a case where you injure passenger during the use of smartphone while walking, crimes of injury through negligence, penalty of JPY 300,000, or petty fine. Did you already know it?"

Announcement seeking information relating to wanted person or escaping criminal

For example, "Does this face look familiar to you?" In a case where the answer "YES" has been received in response to this announcement, a telephone function may be used to call the police on 110.

Announcement prompting vote for election

For example, "Did you go voting?" In a case where the answer "NO" has been received in response to this announcement, a map application may be activated, and the location of a polling station may be displayed.

Announcement prompting pension procedure

For example, "Have you completed pension receiving procedure?" In a case where the answer "NO" has been received in response to this announcement, a browser may be activated, and a relating web page may be displayed.

Announcement prompting tax returns

For example, "Have you done tax returns?" In a case where the answer "NO" has been received in response to this announcement, a browser may be activated, and a relating web page may be displayed.

Announcement prompting vaccination

For example, "Have you got a vaccination against influenza?" In a case where the answer "NO" has been received in response to this announcement, a browser may be activated, and a relating web page may be displayed.

Conceivable examples of enterprise advertisements are described below.

Advertisement for new product

For example, "XX is on sale. Are you interested in it?" In a case where the answer "YES" has been received in response to this advertisement, a browser may be activated, and a relating web page may be displayed.

Effects described herein are only examples, and are not restrictive. Other effects may be exhibited.

The present invention is not limited to the embodiment described above, and includes various variations. For example, each of the embodiments above has been described in detail in order to make the present invention easily understandable, and the present invention is not necessarily limited to an invention including all of the components that have been described. In addition, part of a configuration in a certain embodiment can be replaced with a configuration in another embodiment, and a configuration in another embodiment can be added to a configuration of a certain embodiment. Further, another configuration can be added to, can be removed from, or can be substituted for part of a configuration in each of the embodiments.

REFERENCE SIGNS LIST

10 Portable terminal
11 Processing unit
12 Storage unit
13 Imaging unit
14 Sensor unit
15 Communication unit
16 Input unit
17 Display unit
20 Content server
30 Communication control server
111 Operation-while-moving detection unit
112 Condition setting unit
113 Restriction unit
114 Content reproduction unit
121 Condition information
122 History information
123 User information
124 Question type content
161 Display screen
162 Alerting message
163 Warning message
164 Question
N Network

The invention claimed is:

1. A use restriction method for a portable terminal, the use restriction method comprising:
   a detection step of detecting an operation-while-moving performed by a user on the portable terminal;
   a restriction step of restricting the user's use of the portable terminal in a case where a time period of the operation-while-moving of the user exceeds a first threshold;
   a reproduction step of reproducing question type content while the user's use is being restricted and a stop of movement of the user is being detected;
   a releasing step of terminating the reproducing of the question type content and releasing the restricting in a case where the user has completed answering the question type content and a time period of the stop of movement of the user exceeds a second threshold, and
   a condition setting step of setting at least one of the first threshold, the second threshold, and a number of questions in the question type content in accordance with history of the restricting.

2. The use restriction method according to claim 1, wherein
   in the condition setting step, as a number of times of the restricting in past increases,
   the first threshold is set to have a smaller value,
   the second threshold is set to have a larger value, and
   the number of questions in the question type content is set to have a larger value.

3. The use restriction method according to claim 1, further comprising:
   a resetting step of resetting the history of the restricting.

4. The use restriction method according to claim 1, wherein
   in the restriction step, visual recognition and an operation of the user are restricted by erasing a current display screen of the portable terminal, or by superimposing another display onto the current display screen.

5. The use restriction method according to claim 1, further comprising:
   an alerting step of alerting the user in a case where the operation-while-moving of the user has been sensed prior to the restriction step.

6. A portable terminal comprising:
   an operation-while-moving detection unit that detects an operation-while-moving performed by a user on the portable terminal;
   a restriction unit that restricts the user's use of the portable terminal in a case where a time period of the operation-while-moving of the user exceeds a first threshold;
   a content reproduction unit that reproduces question type content while the user's use is being restricted and a stop of movement of the user is being detected; and
   a condition setting unit that sets a condition, wherein
   in a case where the user has completed answering the question type content and a period of the stop of movement of the user exceeds a second threshold,
   the content reproduction unit terminates reproduction of the question type content, and
   the restriction unit releases use restriction imposed on the user, and
   the condition setting unit sets at least one of the first threshold, the second threshold, and a number of questions in the question type content in accordance with history of the restricting.

7. A non-transitory computer readable storage medium that stores a program causing a computer of a portable terminal to execute a process comprising:
- a detection step of detecting an operation-while-moving performed by a user on the portable terminal;
- a restriction step of restricting a user's use of the portable terminal in in a case where a time period of the operation-while-moving of the user exceeds a first threshold;
- a reproduction step of reproducing question type content while the user's use is being restricted and a stop of movement of the user is being detected;
- a releasing step of terminating the reproducing of the question type content and releasing the restricting, in a case where the user has completed answering the question type content and a period of the stop of movement of the user exceeds a second threshold; and
- a condition setting step of setting at least one of the first threshold, the second threshold, and a number of questions in the question type content in accordance with history of the restricting.

* * * * *